(12) United States Patent
Hanten

(10) Patent No.: US 8,323,079 B2
(45) Date of Patent: Dec. 4, 2012

(54) WHEY SUCTION DEVICE

(75) Inventor: Jürgen Hanten, Bad Nauheim (DE)

(73) Assignee: Poly-clip System GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 13/232,503

(22) Filed: Sep. 14, 2011

(65) Prior Publication Data
US 2012/0094588 A1    Apr. 19, 2012

(30) Foreign Application Priority Data
Sep. 14, 2010   (EP) ..................................... 10009568

(51) Int. Cl.
*A22C 11/00* (2006.01)
(52) U.S. Cl. ........................................................ 452/31
(58) Field of Classification Search .............. 452/32–36, 452/38, 46–48, 51
See application file for complete search history.

(56) References Cited

U.S. PATENT DOCUMENTS

| | | | |
|---|---|---|---|
| 4,388,039 A | | 6/1983 | Schwarze |
| 4,920,611 A | | 5/1990 | Townsend |
| 5,197,914 A | * | 3/1993 | Powers ........................... 452/32 |
| 5,203,735 A | * | 4/1993 | Stanek ........................... 452/38 |
| 5,352,151 A | * | 10/1994 | Piereder ........................ 452/32 |
| 5,378,193 A | * | 1/1995 | Stanley et al. ................. 452/45 |
| 7,597,613 B2 | * | 10/2009 | Staudenrausch ............... 452/32 |
| 2009/0111366 A1 | | 4/2009 | Staudenrausch |

FOREIGN PATENT DOCUMENTS

| | | |
|---|---|---|
| EP | 0 908 103 B1 | 10/2003 |
| EP | 1 464 224 B1 | 1/2007 |
| EP | 2 070 846 A1 | 6/2009 |
| FR | 2183200 A1 | 12/1973 |
| GB | 828305 | 2/1960 |
| GB | 964256 | 7/1964 |

OTHER PUBLICATIONS

EP 0 908 103 B1—English abstract obtained from Espacenet (http://worldwide.espacenet.com) accessed on Feb. 8, 2012, 1 page.
EP 1 464 224 B1—English abstract obtained from Espacenet (http://worldwide.espacenet.com) accessed on Feb. 8, 2012, 1 page.
Computer translation of FR 2.183.200 from European Patent Office website, 3 pgs, Oct. 21, 2011.

* cited by examiner

*Primary Examiner* — Richard Price, Jr.
(74) *Attorney, Agent, or Firm* — Hahn Loeser & Parks LLP; Bret A. Hrivnak, Esq.

(57) ABSTRACT

A clipping machine and a method for producing sausage-shaped products formed by a tubular casing material containing a flowable filling material. The clipping machine includes a filling tube for feeding filling material into the tubular casing material stored on the filling tube and being closed at the front end by a closing clip. The clipping machine further includes a closing device including at least two closing tools, being reversably movable relative to one another between an opened position and a closed position for placing and closing at least one closing clip for forming a sausage-shaped product. In addition, a suction device is provided, having at least a suction opening being located in the region of the front end of the filling tube for sucking a fluid segregated from the filling material into the tubular casing material while being filled.

10 Claims, 2 Drawing Sheets

WHEY SUCTION DEVICE

This application claims priority to, and the benefit of, European Patent Application No. 10 009 568.6 filed Sep. 14, 2010 with the European Patent Office, which is hereby incorporated by reference.

BACKGROUND OF THE INVENTION

The present invention relates to a clipping machine for producing sausage-shaped products as well as a method for producing sausage-shaped products.

In particular, the present invention relates to a clipping machine for producing sausage-shaped products, like sausages, formed by a tubular casing material containing a flowable filling material, like food stuff. The clipping machine comprises a filling tube for feeding filling material into the tubular casing material stored on the filling tube and being closed at the front end by a closing clip and a closing device including at least two closing tools, being revers ably movable relative to one another between an opened position and a closed position for placing and closing at least one closing clip for forming a sausage-shaped product.

The present invention further relates to a method for producing sausage-shaped products, like sausages, formed by a tubular casing material containing a flowable filling material, like food stuff. The method comprises the steps of feeding filling material via a filling tube into the tubular casing material stored on the filling tube and being closed at the front end by a closing clip and forming a sausage-shaped product by placing and closing at least one closing clip by a closing device comprising at least two closing tools being reversably movable relative to one another between an opened position and a closed position.

In the practice, it is known that, for example in the production of sausage-shaped products, filling material is fed by a filling machine through a filling tube of a clipping machine into a tubular casing material, which is stored on the filling tube and which is closed at its front end by a closing clip. The tubular casing material is pulled off from the filling tube while being filled. After a predetermined volume of filling material is filled into said tubular casing material, a displacement device with a first and a second pair of displacement elements forms a plait-like portion of the tubular casing material and the clipping machine places and closes at least one closing clip at the plait-like portion by respective closing tools which are reversibly movable towards the plait-like portion. Said sausage-shaped products may contain various flowable materials, e.g., sausage meat, grease, adhesives, sealing compounds or the like. Such a device and a method for producing tubular packing casings and filling said casings in order to produce sausage-shaped products is disclosed in EP-patent 0 908 103.

In the above described manner of producing sausage-shaped products, filling material fed into the tubular casing may be of different kind and consistency. In particular, extreme solvent filling material or a flowable filling material segregating a fluid like water or whey during the filling process may be fed to the tubular casing. Said segregated fluid may be accumulated inside of the tubular casing material stored on the filling tube by entering the casing break device by the capillary attraction. The fluid accumulated inside the tubular casing may lead to a deformation or damage of the casing material or to an irregular pull-off of the casing material from the filling tube. Moreover, in case that said fluid will be fed into the sausage-shaped product, a fluid bubble is formed inside the product, affecting the quality of said sausage-shaped product.

BRIEF SUMMARY OF THE INVENTION

Thus, it is an object of the present invention to provide a clipping machine for producing sausage-shaped products as well as a method for producing sausage-shaped products, with which the above mentioned drawbacks can be overcome and with which the production of sausage-shaped products can be assured, in particular, with which the quality of said sausage-shaped product can be increased and deformations and damages of the casing material can be avoided.

According to the present invention, there is provided a clipping machine for producing sausage-shaped products, like sausages, formed by a tubular casing material containing a flowable filling material, like food stuff. The clipping machine comprises a filling tube for feeding filling material into the tubular casing material stored on the filling tube and being closed at the front end by a closing clip and a closing device including at least two closing tools, being reversably movable relative to one another between an opened position and a closed position for placing and closing at least one closing clip for forming a sausage-shaped product.

The clipping machine further comprises a suction device having at least a suction opening being located in the region of the front end of the filling tube for sucking a fluid segregated from the filling material into the tubular casing material while being filled. By sucking the fluid segregated from the filling material into the tubular casing material, deformations or damages to the casing material may be avoided and a continuous filling process may be assured.

In an advantageous configuration, the suction device includes a suction pump and a suction pipe. The suction pump may be coupled to the control unit of the clipping machine or a production line comprising said clipping machine, to be controlled by said control unit.

The size of the suction pump and the suction pipe is adapted to the expected amount of segregate. In case of a small amount of segregated fluid to be expected and/or in case of a continuous sucking of the segregated fluid, a small suction pipe may be used, which than may be arranged along the surface of the filling tube, in particular, the suction pipe extends along the outer surface of the filling tube, preferably parallel to the longitudinal axis of the filling tube.

In order to control the pull-off speed of the tubular casing material when pulled off from the filling tube, a casing break device is positioned in the region of the front end of the filling tube.

In a further advantageous configuration of the clipping machine, a caliber ring is positioned in the region of the front end of the filling tube to unfold the tubular casing stored on the filling tube when pulled off therefrom and to provide a constant diameter to said tubular casing material.

Due to the fact that segregated fluid may be accumulated inside of the tubular casing material stored on the filling tube by entering the casing break device or the caliber ring by the capillary attraction, it is advantageous that the suction pipe ends upstream the casing break device or the caliber ring.

Typically, the diameter of the tubular casing material to be filled is larger than the diameter of the filling tube to avoid unnecessary frictional forces between the filling tube and the casing material while being pulled off therefrom. Thus, it is further advantageous that the suction pipe terminates in the region of the front end of the filling tube in a tube bent. Said tube bent should be directed downwards to allow sucking of the segregated fluid accumulated in the casing material below.

The clipping machine should further comprise a control device for controlling the suction device in accordance with the clipping operation. A suction action may not necessarily execute permanently. In case of filling material segregating a small amount of fluid, said suction action may be done after a predetermined number of clipping operations. Moreover an effective suction of the segregated fluid may be occur at a time point in the production process, in which the casing material is not moved, e.g. when not pulled off from the filling tube.

In a specific configuration of the suction device, a sensor may be positioned in the region of the suction opening of the suction device, in particular in the region of the suction opening. Alternatively, said sensor may also be positioned at the filling tube or a holding ring carrying the tube bent. The sensor may sense the presence and/or the amount of the segregated fluid and may automatically start and/or the suction process when coupled to the control unit of the clipping machine or the pump of the suction device.

According to the present invention, there is further provided a method for producing sausage-shaped products, like sausages, formed by a tubular casing material containing a flowable filling material, like food stuff. The method comprises the steps of feeding filling material via a filling tube into the tubular casing material stored on the filling tube and being closed at the front end by a closing clip, and forming a sausage-shaped product by placing and closing at least one closing clip by a closing device comprising at least two closing tools being reversably movable relative to one another between an opened position and a closed position.

The inventive method further includes the step of sucking a fluid segregated from the filling material into the tubular casing material during the filling process by a suction device having at least a suction opening being located in the region of the front end of the filling tube, to prevent the tubular casing to be affected by the fluid segregated by the filling tube.

Advantageously, the inventive method further includes the step of controlling the suction device by a control device in accordance with the clipping operation, to allow the suction action to occur at a predetermined time point during the production process.

In the following, further advantages and embodiments of the inventive method and the inventive clipping machine are described in conjunction with the attached drawings. Thereby, the expression "left", "right", "below" and "above" are referred to the drawings in an orientation of the drawings which allows the normal reading of the reference numbers.

DETAILED DESCRIPTION OF THE INVENTION

Figure 1:
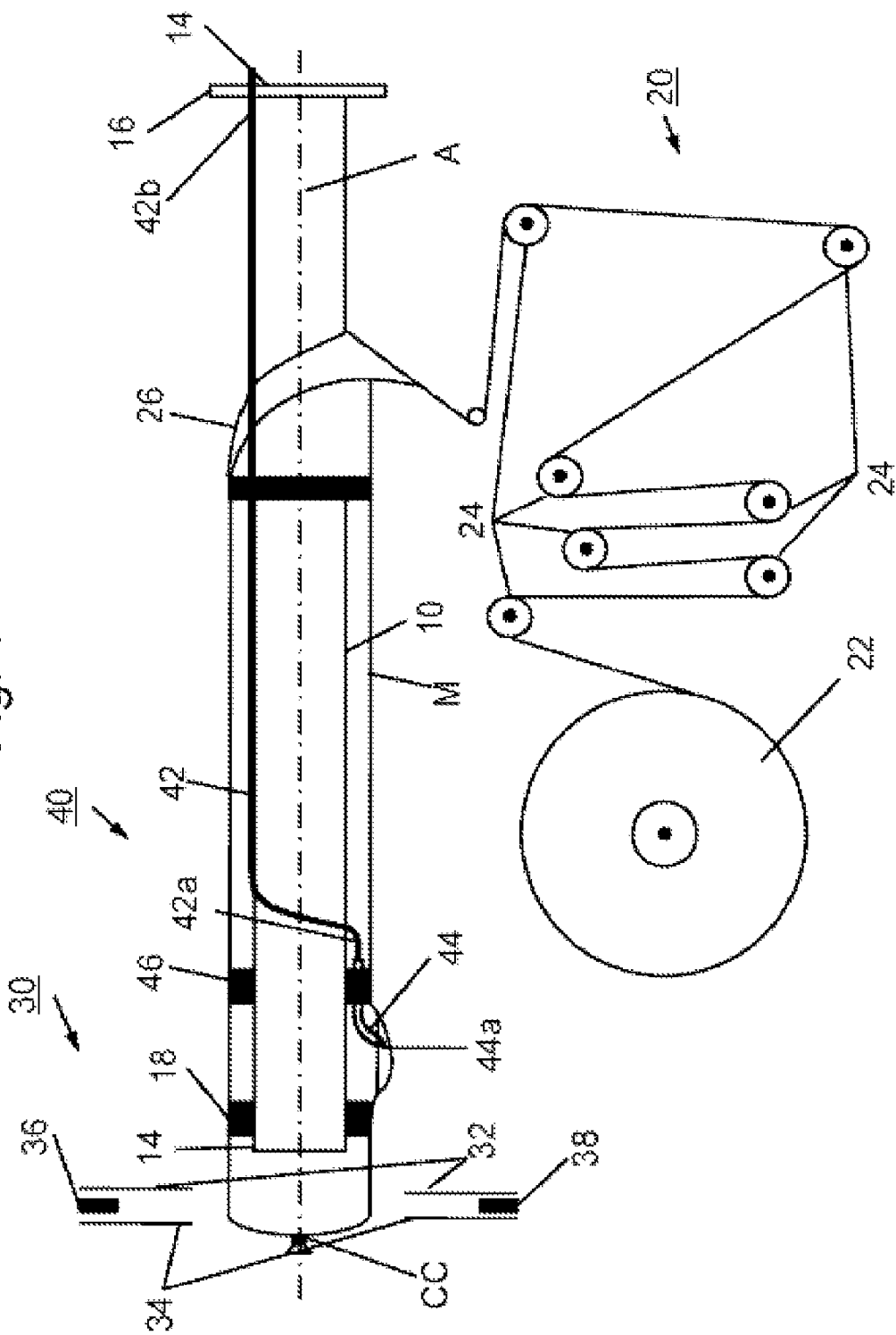
FIG. 1: is a schematically view of a clipping machine according to the present invention.

The exemplarily clipping machine for producing sausage-shaped products according to FIG. 1, comprises as main components a filling tube 10, which comprises a longitudinally extending axis A, and on which tubular casing material M is stored, and a clipping device 30 for closing the filled tubular casing material M.

Horizontally arranged filling tube 10 having a left end 12 and a right end 14, is coupled to filler (not shown) by its right end 14 via a coupling device, like a pivotal coupling hinge or a flange 16 as shown in FIG. 1. Moreover, a schematically shown casing break device 18 is attached to the filling tube 10 in the region of its left end 12.

As an example for providing tubular casing material to filling tube 10, a tubular casing forming device 20 is provided below filling tube 10. Device 20 comprises a storage reel 22 for storing flat film material thereon, guide rollers 24, a forming shoulder 26 and a not shown sealing device. Downstream filling tube 10, a schematically shown clipping device 30 is arranged in front of the left side opening of filling tube 10. Clipping device 30 comprises a first and a second pair of displacer elements 32, 34 for forming in known manner a plait-like portion of the tubular casing material M being at least approximately free of filling material. Moreover, closing tools in the form of a punch 36 arranged between displacer elements 32, 34 above filling tube 10 and a die 38 positioned between displacer elements 32, 34 below filling tube 10 opposite to punch 36 are provided for attaching at least one closure clip CC at the plait-like portion of the tubular casing material M. Clipping device 30 further comprises respective drives for driving displacer elements 32, 34, punch 36 and/or die 38, which are not shown. Moreover, a clip supply, also not shown, is provided for storing and supplying closure clips to closing tools 36, 38. In order to separate a just produced sausage-shaped product from the remaining tubular casing material M stored on the filling tube 10, a cutting device (not shown) is provided, which includes a knife and a respective drive for said knife which cuts the tubular casing material M in the region of the plait-like portion, preferably between two closure clips CC.

As it further can be seen in FIG. 1, a suction device 40 is provided to the clipping machine. Suction device 40 comprises a suction pipe 42 mainly extending above filling tube 10 along the outer surface of filling tube 10. Suction pipe 42 has a first end 42a and a second end 42b. First end 42a of suction pipe 42 is guided below filling tube 10 and terminates in a bent portion 44. Bent portion 44 is held by a ring 46, which is positioned upstream casing break device 32, and which may be a caliber ring including a sealing element and having an outer diameter corresponding to the inner diameter of the tubular casing material M. Ring 46 holds bent portion 44 in a position as segregated fluid accumulated between casing break device 32 and ring 46 to be engaged and sucked by the suction opening 44a of bent portion 44. Second end 42b of suction pipe 42 is coupled to a suction pump (not shown) for sucking segregated fluid accumulated between casing break device 32 and ring 46.

Figure 2:
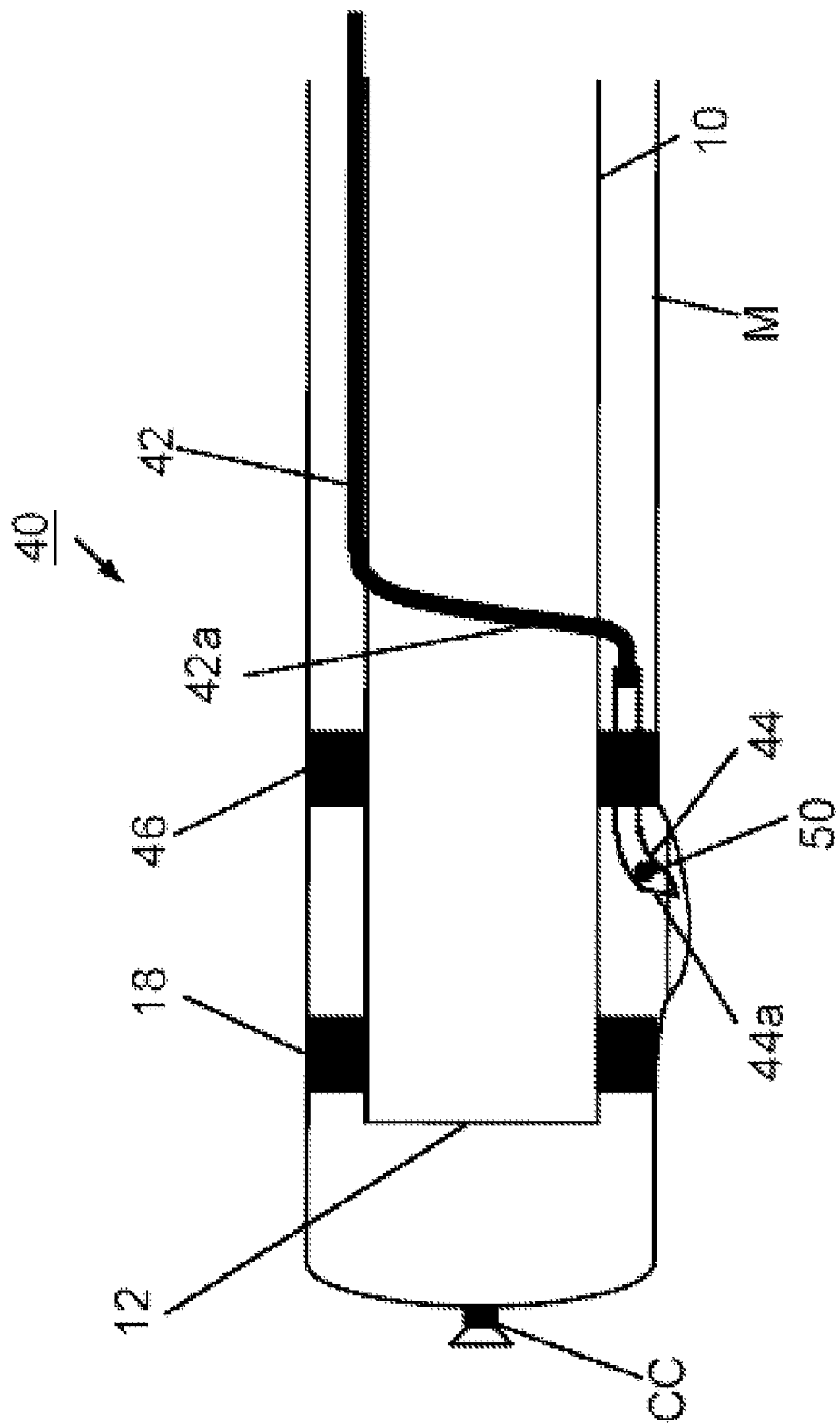
FIG. 2: is a schematically detailed view to the front end of the suction device according to the present invention.

FIG. 2 is a detailed view to the front end of the suction device 40 according to the present invention showing the left end 12 of filling tube 10 including casing break device 18 and, upstream thereto, ring 46 of suction device 40. Bent portion 44 held by ring 46 extends trough ring 46. Upstream ring 46, bent portion 44 is coupled to first end 42a of suction pipe 42. Downstream ring 46, bent portion 44 has an S-shaped bow directed downwards from filling tube 10 and terminating in a suction opening 44a.

As it further can be seen in FIG. 2, a sensor 50 is attached to bent portion 44 of suction pipe 42. Sensor 50 is positioned in the region of suction opening 44a. In this position, sensor 50 may detect the segregated fluid accumulated between casing break device 18 and ring 46, and may output a signal to the control unit of suction device 40 or the clipping machine to start or stop the suction procedure.

The inventive method for producing sausage-shaped products, like sausages, will now be described in conjunction with the clipping machine according to FIGS. 1 and 2.

For producing sausage-shaped products containing a flowable filling material, like a sealing compound, adhesives, silicones, sausage meat or the like, in a tubular casing material M, tubular casing material M is provided at filling tube 10 of the clipping machine. The front end of tubular casing material M is closed by closure clip CC. A pump feeds filling material via filling tube 10 into tubular casing material M. Casing material M is pulled off from filling tube 10 by the force of flowing filling material M. At the same time, flat film material is pulled off from storage reel 22, guided along rollers 24 and bent by forming shoulder 26 around filling tube 10. Thereby, longitudinal edges of the flat film material overlay each other. Subsequently, said overlaying edges are sealed by a not shown sealing device, whereby the tubular casing M is formed.

After a predetermined portion of filling material is fed into tubular casing M, displacer elements 32, 34 gather the filled tubular casing M and form a plait-like portion thereto, which is at least approximately free from filling material. A first closing clip CC is placed on said plait-like portion and closed by punch 36 and die 38 in order to form a sausage shaped product. Simultaneously, a second closure clip CC is placed on said plait-like portion in order to close the front end of the tubular casing material M stored on filling tube 10 and forming the front end of the subsequent sausage-shaped product to be produced.

In order to assure a defined and constant pull-off speed of casing material M from filling tube 10, casing break device 18 applies a frictional force to tubular casing M while sliding over casing break device 18 when being pulled off from filling tube 10. Casing break device 18 has an outer diameter corresponding to the inner diameter of tubular casing material M. While sliding over casing break device 18, casing material M is unfolded and stretched into its cylindrical form.

In case of feeding filling material into tubular casing material M, like an extreme solvent filling material or a flowable filling material segregating a fluid like water or whey, said segregating fluid will get into the space between filling tube 10 and casing material M in a region upstream casing break device 18 by the capillary attraction. Said segregating fluid accumulates upstream casing break device 18.

Depending on the amount of said segregating fluid accumulated between filling tube 10 and casing material M, casing material M will be deformed. Said deformation may affect the quality of the sausage-shaped product, e.g. by forming a bump to the sausage shaped product just produced. In case of sensitive casing material M, said casing material may be ruptured by said segregated fluid or may be weakened, and thus, a casing burst may occur while filling said weakened casing material.

Said segregating fluid accumulated upstream casing break device 18 is sucked by suction device 40. Bent portion 44 held by ring 46, has a suction opening and is positioned below filling tube 10 as to engage the fluid segregated in the space between casing break device 18 and ring 46. Suction device 40 comprises a suction pump (not shown), which is coupled to the control unit of the clipping machine in order to control suction device 40.

Sensor 50 positioned near suction opening 44a of bent portion 44, detects the segregated fluid accumulated between casing break device 18 and ring 46, and putts out a signal to the control unit of the clipping machine or the pump of suction device 40. Based on this signal, the amount or the level of the segregated fluid may be sensed and the suction procedure may be controlled, e.g. by starting or stopping the suction pump.

Ring 46, which may be made of a suitable material like plastic or rubber, not only holds bent portion 44 of suction device 40 in its position. Ring 46 may also act as a caliber ring to perform and/or unfold tubular casing material M. Moreover, a sealing element like a lip may be incorporated in ring 46 to prevent segregated fluid to get into the region upstream ring 46.

Depending on the amount of fluid segregated while producing sausage-shaped products, suction device 40 may be activated permanently or in respective intervals. Said activating intervals may be selected manually by the operator or automatically on the bases of the filling material used.

Suction device 40 as described above includes a suction pipe 42 attached to the outside of filling tube 10. Alternatively, a suction pipe may also be provided in the form of a channel incorporated in the wall of filling tube 10 or at the inside of filling tube 10.

In conjunction with FIGS. 1 and 2, tubular casing material M has been described as being fed to filling tube 10 in form of a flat film material bent about filling tube 10 and sealed by a sealing device, or "produced inline". Naturally, packing material M may also be provided to filling tube 10 in the form of a tubular casing shifted onto filling tube 10.

In a specific embodiment of suction device 40, ring 46 including bent portion 44 as well as suction pipe 42 are reversibly attachable to filling tube 10 by respective fixing elements. In this case, suction device 40 may be provided as an upgrade to existing clipping machines.

Sensor 50 is, according to FIG. 2, positioned at bent portion 44 near suction opening 44a. Alternatively, sensor 50 may also attached to filling tube 10, e.g. at the under side of filling tube 10 between casing break device 18 and ring 46. It is also possible to place sensor 50 at ring 46 or to incorporate sensor 50 into ring 46, e.g. together with bent portion 44.

Suction device 40 provided as an upgrade to existing clipping machines, need not necessarily be coupled to the control unit of said clipping machine but may also be manually controlled by the operator.

The invention claimed is:

1. A clipping machine for producing sausage-shaped products formed by a tubular casing material containing a flowable filling material said clipping machine comprising:
    a filling tube for feeding filling material into the tubular casing material stored on the filling tube and being closed at a front end by a closing clip;
    a closing device including at least two closing tools, being reversably movable relative to one another between an opened position and a closed position for placing and closing at least one closing clip for forming a sausage-shaped product; and
    a suction device having at least a suction opening being located below the filing tube and in a region of a front end of the filling tube for sucking a fluid segregated from the filling material into the tubular casing material while being filled, wherein a sensor is positioned in a region of the suction opening of the suction device.

2. The clipping machine according to claim 1, wherein the suction device includes a suction pump and a suction pipe.

3. The clipping machine according to claim 2, wherein the suction pipe extends along a surface of the filling tube.

4. The clipping machine according to claim 2, wherein the suction pipe terminates in the region of the front end of the filling tube in a tube bent.

5. The clipping machine according to claim 1, wherein a casing brake device is positioned in the region of the front end of the filling tube.

6. The clipping machine according to claim 1, wherein a caliber ring is positioned in the region of the front end of the filling tube.

7. The clipping machine according to claim 5 further comprising a caliber ring that is positioned in the region of the front end of the filling tube, wherein a suction pipe of the suction device ends upstream the casing brake device or the caliber ring.

8. The clipping machine according to claim 1 further comprising a control device for controlling the suction device in accordance with a clipping operation.

9. A method for producing sausage-shaped products formed by a tubular casing material containing a flowable filling material, said method comprises the steps of:

feeding filling material via a filling tube into the tubular casing material stored on the filling tube and being closed at a front end by a closing clip;

forming a sausage-shaped product by placing and closing at least one closing clip by a closing device comprising at least two closing tools being reversably movable relative to one another between an opened position and a closed position;

detecting a fluid segregated from the filling material into the tubular casing material during the filling process by a sensor; and, sucking the fluid by a suction device having at least a suction opening being located below the filling tube and in a region of a front end of the filling tube.

10. The method according to claim 9 further comprising the step of controlling the suction device by a control device in accordance with a clipping operation.

* * * * *